J. MADER.
TRACTION MACHINE.
APPLICATION FILED JAN. 5, 1920.

1,401,625.

Patented Dec. 27, 1921.
3 SHEETS—SHEET 3.

INVENTOR
JOSEPH MADER
BY Paul & Paul
HIS ATTORNEYS.

UNITED STATES PATENT OFFICE.

JOSEPH MADER, OF MINNEAPOLIS, MINNESOTA, ASSIGNOR TO BEEMAN TRACTOR COMPANY, OF MINNEAPOLIS, MINNESOTA, A CORPORATION OF MINNESOTA.

TRACTION-MACHINE.

1,401,625.     Specification of Letters Patent.     Patented Dec. 27, 1921.

Application filed January 5, 1920. Serial No. 349,378.

*To all whom it may concern:*

Be it known that I, JOSEPH MADER, a citizen of the United States, resident of Minneapolis, county of Hennepin, State of Minnesota, have invented certain new and useful improvements in Traction-Machines, of which the following is a specification.

My invention relates to that type of traction machines wherein the internal combustion engine or source of motive power is suspended between the supporting means and the machine is guided by a walking operator. The object of my invention is to provide a machine of this type wherein provision is made for increasing the traction and thereby avoiding slippage in sandy or soft soil.

A further and particular object is to provide improved means for supporting or mounting the traction means of the machine to the end that efficiency in the highest degree can be attained.

Other objects of the invention will appear from the following detailed description.

The invention consists generally in various constructions and combinations, all as hereinafter described and particularly pointed out in the claims.

Figure 1:
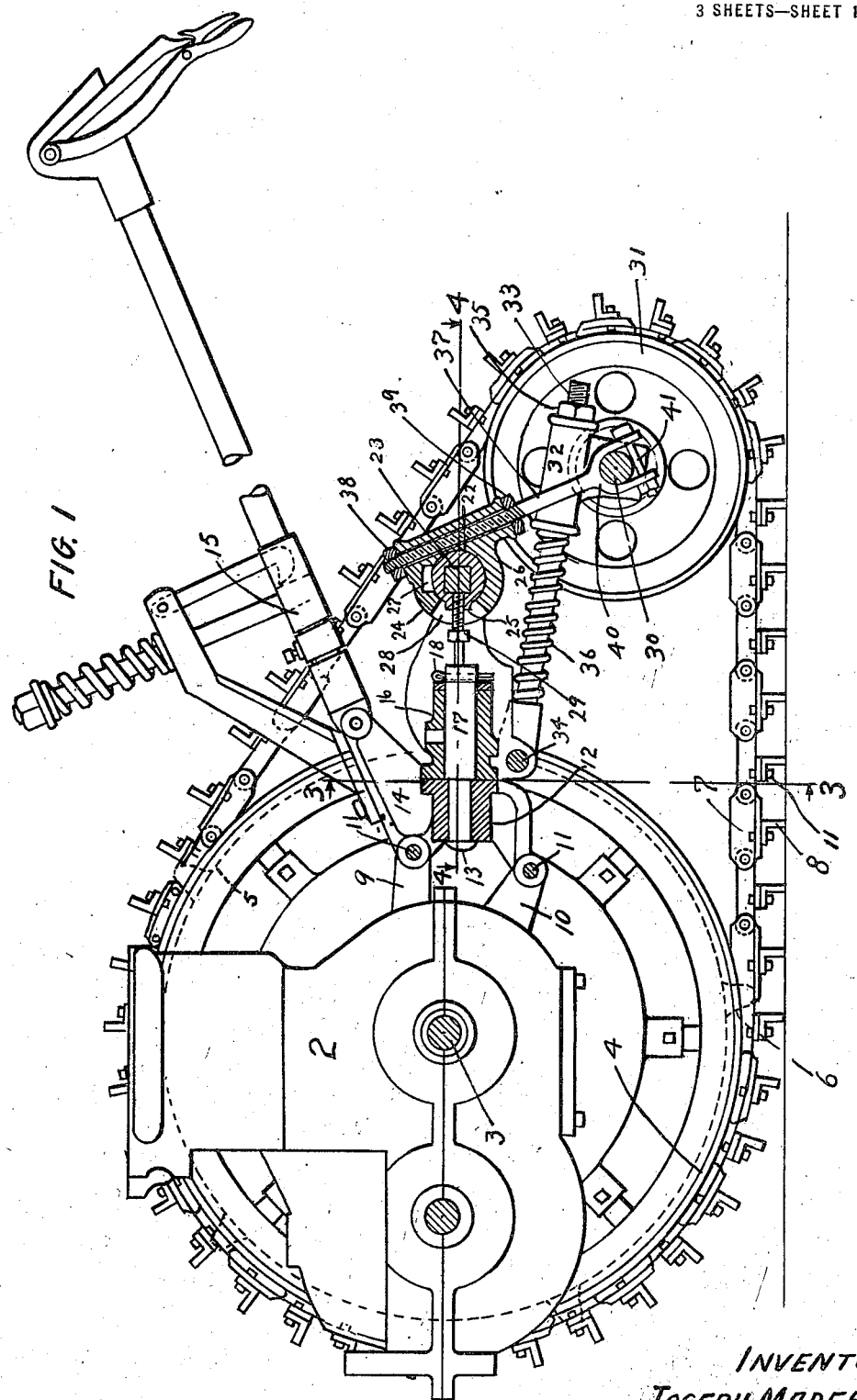
Figure 2:
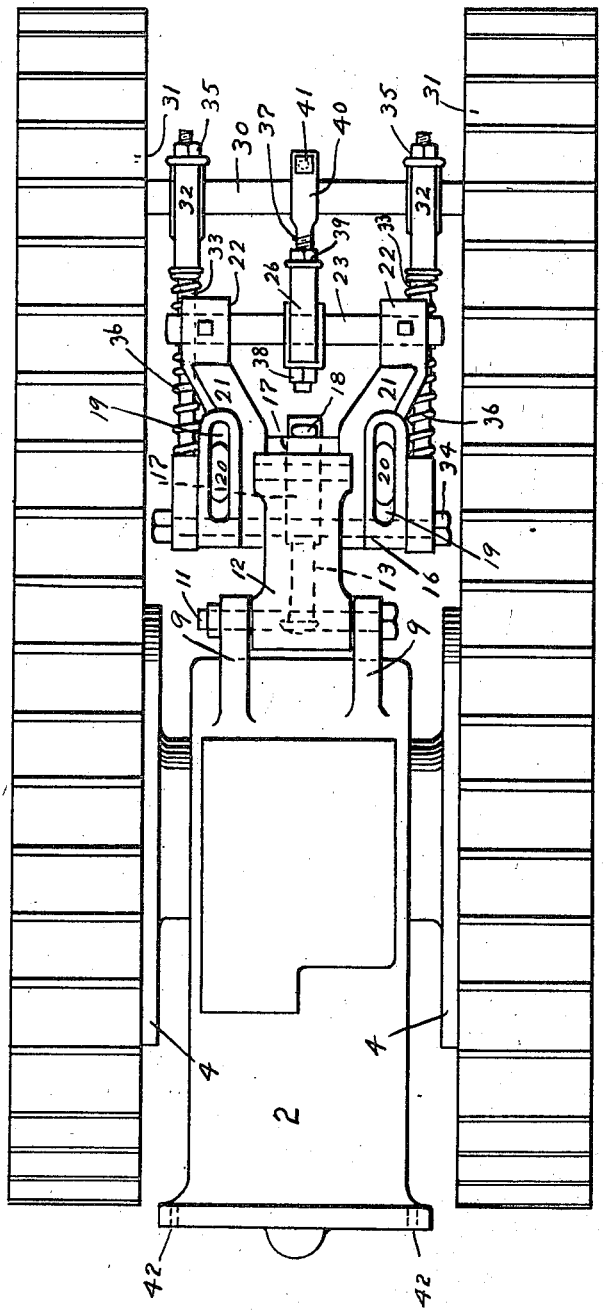
Figure 3:
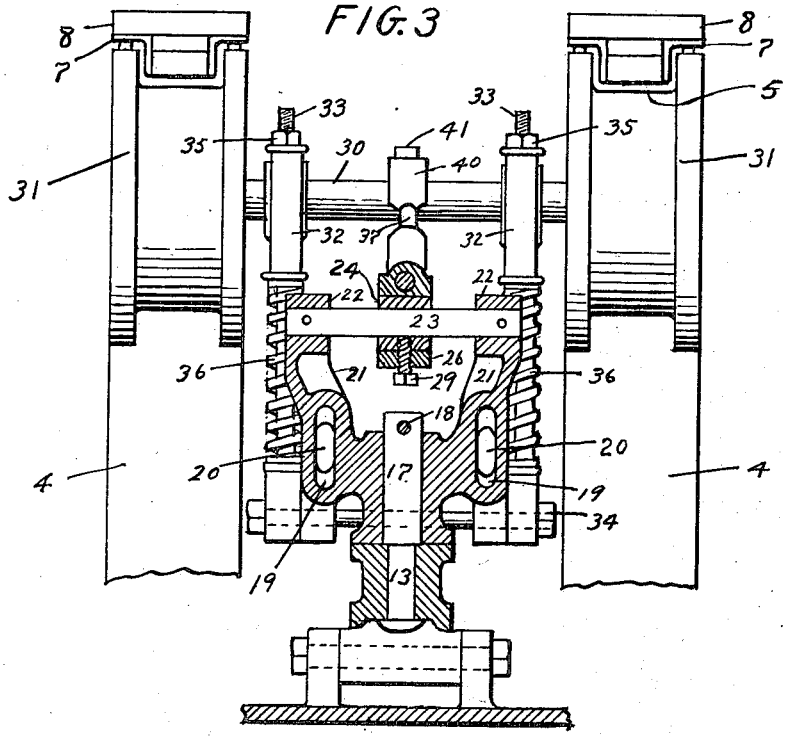
Figure 4:
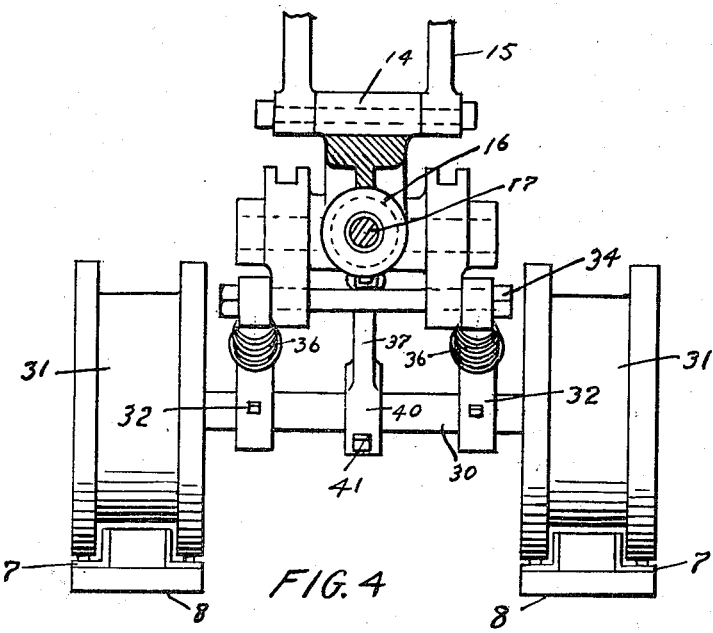

In the accompanying drawings forming part of this specification,

Figure 1 is a side view, partially in section, of a traction machine embodying my invention, Fig. 2 is a plan view, Fig. 3 is a sectional view on the line 3—3 of Fig. 1, Fig. 4 is a sectional view on the line 4—4 of Fig. 1, In the drawing, 2 represents an internal combustion engine of any suitable type, 3 the crank shaft therefor and 4 wheels having concave peripheries 5 and sprocket teeth 6 at intervals to engage the links of sprocket chains 7 whereon traction shoes 8 are mounted at intervals. The crank case of the engine is provided with lugs 9 and 10 arranged in pairs and mounted on these lugs by means of bolts 11 is a bracket 12 in which a rearwardly projecting pin 13 is cast. Arms 14 project upwardly from the bracket and on these arms steering posts 15 for guiding the machine are mounted. A yoke 16 is mounted on the rearwardly projecting portion 17 of the pin 13 and is free to rock thereon, being held in place by suitable means, such as a cotter pin 18. This pin allows the yoke to turn freely on the pin 17 and when the cotter pin is withdrawn from its socket, the yoke may be readily detached from the machine.

On each side of the extension 17 of the pin 13, I provide elongated slots 19 in which the shanks 20 of cultivators or other ground-working implements may be mounted in any suitable way. In the rear of these slots the yoke is provided with arms 21 terminating in hubs 22 in which the shaft 23 is secured. This shaft, as shown in Fig. 2, is preferably rectangular in cross section and a hub 24 is mounted thereon and provided with a boss 25. A block 26 preferably a casting, has an opening to receive a hub 24 and a recess 27 for the insertion of the boss 25. When the parts are assembled, the hub 24 is slipped into the opening in the block with the boss 25 inserted into the recess 27 and then when the desired point of adjustment is reached, the block 26 is rotated on the hub, the boss 25 entering a recess 28 and at this point the hub is locked on the shaft by the adjustment of a clamping screw 29. When this screw is loosened, the hub may be moved back and forth on the shaft, as desired.

A shaft 30 supports wheels 31 having channel peripheries corresponding to those of the larger wheels 4 without the sprocket teeth, and the shaft 30 is provided with hubs 32 to receive rods 33 which are pivoted on a bolt 34 mounted on the underside of the yoke 16 and projecting rearwardly through the hubs 32 are provided with threaded portions for adjusting nuts 35 by means of which the tension of the traction belts can be increased or decreased, as desired. The hubs 32, of which there is preferably one at each end of the shaft 30, are free to slide on the rods 33 and compression springs 36 are interposed between the loops 32 and the forward ends of the bolts for the purpose of normally resisting forward movement of the hubs on the bolts but allowing them to slide thereon in case stone, pieces of wood or other hard substance becomes lodged between the belts and the supporting wheels 31. In other words, these compression springs allow the automatic adjustment of the wheels 31 to compensate for any obstruction which may accumulate between these wheels and the belts. The tension of the belts, however, is regulated entirely as far as the rods 33 are concerned, by means of the adjusting nuts 35. The block 26 is also provided with a socket to receive a rod 37 having a threaded end fitting within the socket in the block and provided with adjusting nuts 38 and 39 by means of which the rod may be moved up and down in the block, as desired. The lower end of the rod has a fork 40 which straddles the shaft 30 and is held in place thereon by suitable means, preferably a bolt 41. The function of this rod 37 is to hold the shaft 30 and the traction belts down upon the ground and this downward pressure may be increased or decreased by the adjustment of the nuts 38 and 39. I have shown one of these rods 37 in the center of the shaft 30, but obviously it may be moved to a point near one of the hubs 22 and another rod provided adjacent the opposite hub. This, however, would be merely a duplication of this part of the structure.

With this apparatus the shaft 30 and the wheels 31 are free to oscillate vertically on the shaft 34 as a center, the hubs 32 sliding on the rods 33 sufficiently to allow for such movement and the rods 33 also oscillating on the bolts 34, and the said described parts may also rock or tilt on the extension of the pin 13 as an axis so that the wheels 31 and the belts supported thereby may readily accommodate themselves to any inequalities of the ground over which the machine may be moving.

It will be noted that the traction belts have long bearing surfaces on the ground and without adding materially to the weight of the machine, the traction power is greatly increased and thereby the utility and efficiency of the machine in soft or sandy soil is increased to a marked extent.

As indicated in Fig. 3, there is sufficient space between the belts for the operation of ground-working implements, such as cultivators and the like, and whenever desired, connections may be made at 42 at the front of the machine for pushing implements of various kinds, such as grass cutters, where the use of a traction belt with a long traction bearing surface may be particularly desirable.

I claim as my invention:—

1. A machine of the class described comprising an internal combustion engine, wheels mounted thereon, traction belts for said wheels, a pair of smaller wheels in the rear of said first named wheels and having peripheries to receive said traction belts, means interposed between the frame of the engine and said rear wheels for exerting the desired degree of tension on said belts, means for holding said rear wheels toward the ground and a guiding means for said machine.

2. A machine of the class described comprising an internal combustion engine having a frame and a pair of wheels mounted thereon, a second pair of smaller wheels in the rear of said first named wheels, traction belts encircling said pairs of wheels, the smaller pair of wheels being mounted to rise and fall with the inequalities of the ground and rock laterally upon their supports, and means for guiding the machine.

3. The combination, with a frame and a forward pair of wheels mounted thereon, of a second pair of wheels in the rear of said first named wheels and of less diameter, traction belts encircling said forward and rear wheels, means interposed between said rear wheels and said frame for holding said rear wheels and the belts thereon downwardly, means pressing rearwardly on said second pair of wheels and exerting the desired degree of tension on said belts, and means for guiding said frame.

4. The combination, with a frame and a pair of supporting wheels therefor, of a yoke mounted for rotary movement on said frame, a second pair of wheels in the rear of said first named wheels, traction belts having bearings on said pairs of wheels, means connecting said rear pair of wheels with said yoke for allowing said rear wheels to rock and said belts to adjust themselves to inequalities of the soil, and a guiding means for said frame.

5. The combination, with a frame and a pair of supporting wheels therefor, of a yoke mounted for rotary movement on said frame, a second pair of wheels in the rear of said first named wheels, traction belts having bearings on said pairs of wheels, means connecting said rear pair of wheels with said yoke for allowing said rear wheels to rock and said belts to adjust themselves to inequalities of the soil, and said rear wheels being also mounted to tilt vertically with said belts, and a guiding means for said frame.

6. The combination, with a frame and comparatively large wheels mounted thereon, of a pair of small wheels in the rear of said first named wheels, traction belts having bearings on the peripheries of said forward and rear wheels, a yoke mounted for rotary movement on said frame, rods having bearings in said frame and slidably connected with said rear smaller wheels and having means for adjusting them with respect to said belts, and means for yieldingly resisting the forward movement of said rear wheels on said rods.

7. The combination, with a frame and wheels mounted thereon and a pair of wheels in the rear of said first named wheels and having a shaft and a hub mounted thereon, of a yoke mounted on said frame and a rod pivoted on said yoke and slidable in said hub and having means for adjustment therein, and a compression spring mounted on said rod between said hub and said yoke and traction belts having bearings on the peripheries of said wheels.

8. The combination, with a frame and wheels mounted thereon, of a yoke mounted on said frame, a shaft and pair of wheels thereon, traction belts having bearings on the peripheries of said wheels, a shaft mounted in said yoke, hubs thereon, blocks mounted to rock on said hubs and rods having bearings in said blocks and engaging the shaft of said rear wheels for exerting a downward pressure thereon.

9. A machine of the class described comprising a frame, forward wheels mounted thereon, rear wheels and a shaft therefor, traction belts having bearings on the peripheries of said forward and rear wheels, a yoke journaled on said frame, and means mounted on said yoke for exerting a downward and rearward pressure on said shaft and rear wheels.

10. A machine of the class described comprising a frame, forward wheels mounted thereon, comparatively small rear wheels, a shaft for said rear wheels, traction belts having bearings on the peripheries of said forward and rear wheels, means supported by said frame and having bearings on said shaft for exerting a downward and rearward pressure on said shaft and rear wheels, and a guiding means mounted on said frame and extending backwardly above said rear wheels in position to be grasped by a walking operator.

11. A machine of the class described comprising an internal combustion engine having a frame and a pair of wheels mounted thereon, a second pair of wheels in the rear of said first named wheels, traction belts encircling said pairs of wheels, said second pair of wheels being mounted to rock on an axis transverse to the plane of the wheels, and means for exerting a backward yielding pressure on said second pair of wheels, and a guiding means for said machine.

12. The combination, with a frame and a pair of supporting wheels therefor and an internal combustion engine carried by said frame, of a second pair of wheels in the rear of said first named wheels, a shaft whereon said second pair of wheels is mounted, traction belts having bearings on said pairs of wheels, rods having bearings on said shaft and upwardly and forwardly inclined, means connected with said frame and having bearings wherein said rods are adjustable, said rods exerting a downward, rearward pressure on said shaft and said wheels.

In witness whereof, I have hereunto set my hand this 23d day of December, 1919.

.JOSEPH MADER.